United States Patent [19]

Ostwald

[11] Patent Number: 4,859,003

[45] Date of Patent: Aug. 22, 1989

[54] METHOD AND DEVICE FOR THE CONTROL OF THE BRAKING EFFECT OF A BRAKE-SLIP-CONTROLLED BRAKE SYSTEM

[75] Inventor: Fritz Ostwald, Dreieich, Fed. Rep. of Germany

[73] Assignee: Alfred Teves GmbH, Frankfurt am Main, Fed. Rep. of Germany

[21] Appl. No.: 638,384

[22] Filed: Aug. 7, 1984

[30] Foreign Application Priority Data

Aug. 24, 1983 [DE] Fed. Rep. of Germany ....... 3330482

[51] Int. Cl.⁴ ........................... B60T 8/64; B60T 8/74

[52] U.S. Cl. ........................................ 303/111; 303/97

[58] Field of Search ............... 188/354, 355, 356, 358, 188/181 R, 181 C, 181 J; 303/97, 100, 104, 106, 112, 119, DIG. 1, DIG. 2, 95, 61, 111

[56] References Cited

U.S. PATENT DOCUMENTS

| | | | |
|---|---|---|---|
| 3,632,177 | 1/1972 | Packer | 188/181 C X |
| 3,637,264 | 1/1972 | Leiber et al. | 303/61 X |
| 4,043,607 | 8/1977 | Signorelli et al. | 303/112 X |
| 4,093,316 | 6/1978 | Reinecke | 303/100 |
| 4,231,620 | 11/1980 | Leiber | 303/119 |
| 4,414,630 | 11/1983 | Harris et al. | 303/97 X |
| 4,418,966 | 12/1983 | Hattwig | 303/100 |
| 4,483,144 | 11/1984 | Steffes | 303/119 X |
| 4,512,615 | 4/1985 | Kita et al. | 303/97 |

FOREIGN PATENT DOCUMENTS

| | | |
|---|---|---|
| 0051801 | 5/1982 | European Pat. Off. . |
| 1901467 | 8/1969 | Fed. Rep. of Germany . |
| 1914765 | 10/1970 | Fed. Rep. of Germany . |
| 2059340 | 11/1971 | Fed. Rep. of Germany . |
| 2038371 | 2/1972 | Fed. Rep. of Germany . |
| 2043278 | 3/1972 | Fed. Rep. of Germany . |
| 2136825 | 3/1972 | Fed. Rep. of Germany . |
| 2303505 | 8/1974 | Fed. Rep. of Germany . |
| 1251832 | 11/1971 | United Kingdom . |
| 1581594 | 12/1980 | United Kingdom . |
| 1601643 | 11/1981 | United Kingdom . |

*Primary Examiner*—Robert J. Oberleitner
*Attorney, Agent, or Firm*—Robert P. Seitter

[57] ABSTRACT

To control the braking effect of a brake-slip controlled hydraulic or pneumatic brake system for automotive vehicle transducers (14, through 18) serve to determine the braking pressure, the axle loads, the translational deacceleration of the vehicle, the brake torque, the brake force and the wheel rotational behavior, and to evaluate these measured values after they have been electronically prepared, logically combined and processed, to control of the braking pressure variation. Upon the occurrence of an anomaly between the translational deacceleration of the vehicle and the braking pressure which is indicative of overbraking, the braking pressure in all or in individual wheel brake cylinders is periodically decreased and/or kept constant and reincreased by virtue of control of the pressure medium supply and its return flow.

4 Claims, 1 Drawing Sheet

F 1 2 3 4 5 6 7 8 9 10 11 12 13 5' 5'' VR VR HR HR 14 15 16 17 18 19 20 21 22 23 24 25 26 27

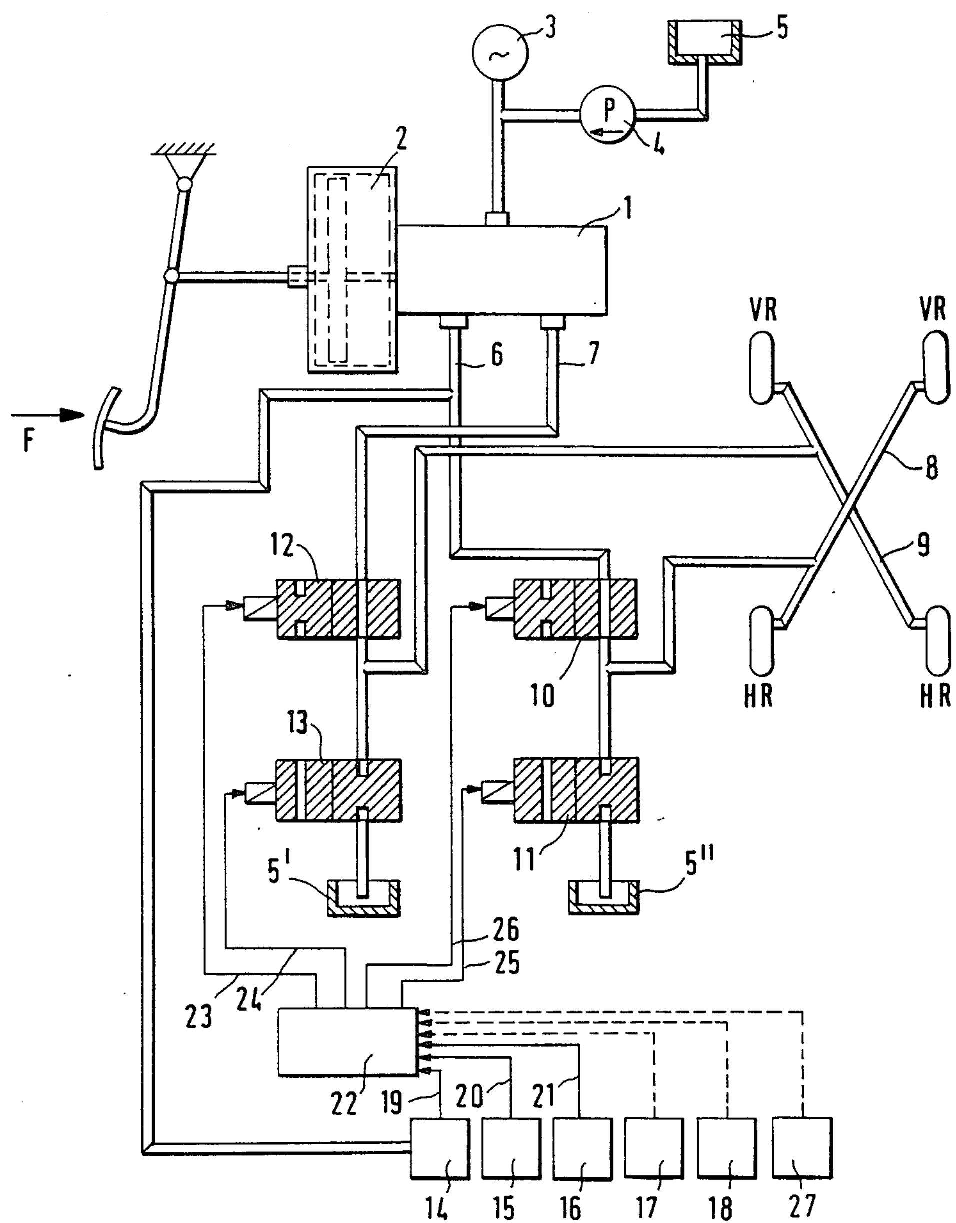
3
5
P
4
2
1
F
6
7
VR
VR
8
9
12
10
HR
HR
13
11
5'
5''
26
25
23
24
22
19
20
21
14
15
16
17
18
27

METHOD AND DEVICE FOR THE CONTROL OF THE BRAKING EFFECT OF A BRAKE-SLIP-CONTROLLED BRAKE SYSTEM

BACKGROUND OF THE INVENTION

The present invention relates to a method for the control of the braking effect of a brake-slip-controlled hydraulic or pneumatic brake system for automotive vehicles, in particular for road vehicles, equipped with an auxiliary energy supply system, in which method the braking behavior will be determined by virtue of tranducers, wherein the measured values will be prepared, logically combined and processed, and wherein in the case of a control action taking place, i.e. on detection of an imminent locked condition, the pressure medium flow to the wheel brake cylinders will be shut off temporarily, pressure medium will be discharged from the wheel brake cylinders and returned into the pressure medium cycle. Upon re-acceleration of the wheel, renewed pressure rise will take place at the proper point of time. Brake systems for implementing this method are within the scope of the present invention.

In the prior art methods and brake systems which serve to prevent the locking of individual or all wheels (toward the end of ensuring driving stability and steerability of the vehicle even under unfavorable conditions, for example in the event of icy roads or aquaplaning or during panic stops) the velocity, deacceleration and acceleration of the individual wheels is measured, compared with the vehicle velocity or a suitable reference input, and signals are derived therefrom for control of the braking pressure variation. The behavior of the vehicle and the braked wheels, respectively, under differing practical conditions, such as road conditions, adhesion of the tires, static and dynamic load of the individual wheels, state of the tires and of the brakes, as well as the behavior of the brakes under the influence of dead times, interference values vary within wide ranges. Accordingly, complicated correlations between the measured values and appropriate controlled variables for the braking pressure variation will result. Further, the transducers are imperfect, and the processing of the measured signals is subject to inevitable disturbing influences. Brake-slip-controlled brake systems therefore are rather complicated.

Hence, the prior art systems deal with correlations between the measured signals and appropriate controlling and regulating measures as well as with the selection and design of sensors, evaluation circuits and braking pressure modulators.

For the purpose of simplification of the control apparatus and reduction of the manufacturing effort, it has been proposed to control individual wheels or one axle only, while the remaining wheels are acted upon by the same amount of braking pressure or by braking pressure derived from the controlled wheels or by uncontrolled braking pressure (European patent application EU-PA 51 801). Overbraking and locking of individual wheels under specific conditions. In such systems in comparison to vehicles where all wheels are controlled, a loss of steerability, a longer stopping distance or unstable driving conditions results.

It is an object of the present invention to propose a method for control of the braking effect, which method allows to be implemented in a simple brake system entailing comparatively little manufacturing effort and which guarantees nevertheless the driving stability of the vehicle will be maintained during the braking operation under all conditions and that effective braking will be accomplished.

SUMMARY OF THE INVENTION

This object is achieved in a simple and technically progressive manner by a method of the type initially referred to in that the inductive transducers directly or indirectly measure the braking pressure, the axle loads and the translational deacceleration of the vehicle, and in that the measured values are evaluated for control of the braking pressure variation in the wheel brake cylinders. Upon the occurrence of an anomaly between the translational deacceleration of the vehicle and the braking pressure, the anomaly being indicative of overbraking or too high braking pressure, respectively, the braking pressure in all or in individual wheel brake cylinders is periodically decreased and/or kept constant and re-increased, in consideration of the respective axle loads, by control of the pressure medium influx and its return.

Hence, the present invention is based on the knowledge that there is close connection between the braking pressure and the translational deacceleration of the vehicle. An imminent unstable condition of the vehicle is therefore detectable by the occurrence of a discrepancy or an anomaly exceeding a threshold value between the translational deacceleration of the vehicle and the braking pressure, the said threshold value, in excess of which brake slip control will commence, permitting to be predetermined as a relation value between braking pressure and deacceleration of as a differential value between actual pressure and nominal pressure in respect of the translational deacceleration measured. Accordingly, there is no need for direct measurement of the wheel rotational behavior. Now, overbraking will be counteracted by periodically decreasing and re-increasing the pressure, if necessary, adding pressure-maintaining phases. In this arrangement, the extent of the "anomaly" or of the discrepancy of the actual values from the calculated nominal values will define the extent of the periodic pressure decrease and the relation between the pressure-decrease phases and the phases in which the pressure is maintained and increased.

If, according to the invention, only the braking pressure in the master cylinder, the axle loads and the translational deacceleration are measured, the advantage is that this purpose necessitates only simple sensors (in contrast to wheel rotational speed sensors) which are fitted at easily accessible locations in the vehicle. It is likewise possible to retrospectively equip a vehicle with such sensors without difficulty. The signal processing, its logic combining and the generation of the control signals can be realized in integrated electronic circuits or by virtue of a microcontroller. In the straightforward embodiment of this invention that will be depicted hereinbelow, the electric output signals cause direct actuation of electromagnetically operable switching valves, for example, two-way/two-position control valves, one two-way-two-position inlet valve and one such outlet valve each sufficing for each diagonal in the event of a diagonal brake-circuit allotment.

Control accuracy can still be improved by use of additional sensors which determine the brake torque and the brake force by means of a strain measuring strip, for example.

BRIEF DESCRIPTION OF THE INVENTION

Further features, advantages and applications of the present invention can be taken from the following description of an embodiment with reference to the accompanying drawing which, in a schematic block diagram, shows the basic principles of a brake system for implementing the method in accordance with the present invention.

DETAILED DESCRIPTION

In the illustrated embodiment of this invention, reference numeral 1 designates a conventional tandem master cylinder which is supplied with the pedal force, indicated by the arrow F, assisted by auxiliary force from a vacuum booster 2. There is also symbolic representation of an auxiliary energy supply system comprising substantially a pressure accumulator 3, a hydraulic pump 4 and a supply reservoir 5. Instead of a vacuum booster 2, the auxiliary source 3, 4, 5 could likewise by utilized for boosting the pedal force in a known fashion.

Connected to the master cylinder 1 are two hydraulic brake circuits 6, 7 which, in this arrangement, lead each to one vehicle diagonal 8, 9 of the wheel that is symbolized in the drawing by the front wheels VR and the rear wheels HR.

The part necessary for the inventive control of the braking effect confine themselves to two two-way/two-position control valves per brake circuit 6, 7. These valves are herein electromagnetically actuatable, quick-acting valves, the valves 10, 12 thereof which connect the outlets of the master cylinder with the diagonals 8, 9 being switched to open passage in the de-energized state. On the contrary, the two valves 11, 13 which connect the wheel brake cylinders of the diagonals 8, 9 to the supply reservoirs 5', 5'' are closed in the de-energized state.

In the simplest embodiment of this invention, the braking behavior of the vehicles is determined solely by means of the sensors 14 through 16. Sensor 14 serves to measure the braking pressure on the master cylinder side in one of the two hydraulic brake circuits, here in brake circuit 6. Sensor 15 which preferably comprises an inclination compensation serves to determine the translational deacceleration, while sensor 16 serves to determine the axle load at any one or at both of the axles. By way of the signal lines 19 through 21, electric signals which correspond to the sensed values will be delivered to the block 22 which contains the electronic circuits and wherein the preparing, the logic combining and the processing of the signals are performed. Suitably, integrated circuits oa microcontroller 22 are utilized to this end.

The electromagnetically actuatable switching valves 10 through 13 are driven by the output signals of the circuit block 22 via the electric connecting lines 23 through 26.

To meet additional requirements of control accuracy, sensors 17 and 18 can be additionally inserted to determine the brake torque and the brake force and corresponding signals thereby can be delivered to circuit block 22 and logically combined with the sensor signals on the lines 19 through 21. In exceptional cases, rotational speed sensors 27 can be additionally fitted to one or several of the wheels VR, HR, with the signals thereof included in the combining and evaluating action.

The mode of function of the brake system illustrated will be described hereinbelow.

When the electronics in circuit block 22 does not detect any anomaly when comparing and logically combining the measured values determined with the aid of sensors 14 thorough 16 (and, if necessary in conjunction with the output signals of the sensors 17 and 18) that is in the absence of locked wheels or imminently locking wheels during all braking operations, the solenoid valves 10 through 13 remain in the illustrated switching position which corresponds to their electromagnetically de-energized initial position. Therefore, both hydraulic circuits 6, 7 of tandem master cylinder 1 are directly connected to the two vehicle diagonals 8, 9 by way of the valves 10, 12; and the return flow by way of the valves 11, 13 to the supply reservoir 5, 5', 5'' (which are interconnected compartments of one common supply reservoir) remains interrupted. Consequently, brake slip control is not effected. The auxiliary energy supply system 3, 4 and 5 is not needed in this embodiment, because the tandem master cylinder 1 is actuated in this event by way of vacuum booster 2.

If, however, a braking anomaly due to overbraking is sensed now which exceeds a predetermined tolerance value and hence leads to assume an imminent unstable condition of the vehicle or of one or several of the wheels, respectively, the inventive brake slip control will start to perform. Namely, switching over and resetting of the valves 10 through 13 causes start of a periodic decrease and renewed increase of the pressure, while phases in which the pressure is kept constant can be interposed by corresponding control, that is to say, by switching over of the inlet valves 10, 12 and by respective de-energization or closing of the outlet valves 11, 13. The pressure-decrease phases will be effected by closing of the inlet valves 10, 12 and simultaneous opening of the outlet valves 11, 13. Pressure increase will then be carried out by switching over the valves to assume their initial position shown in which the outlet is closed and the connection from the master cylinder to the wheel brake cylinder or to the diagonal, respectively, is opened.

Since hydraulic medium is discharged into the supply reservoir during a pressure decrease, this necessitates return delivery or return flow of hydraulic medium, according to a known method, into the working chambers in the master cylinder 1 or directly into the brake circuits 6, 7 for which purpose the auxiliary energy supply system incorporating pressure accumulator 3 and pump 4 is provided. Exhaustion of the hydraulic volume in the master cylinder 1 during brake slip control as a result of the periodic pressure decrease is prevented by resetting, blocking of the (not illustrated) master cylinder pistons or by any other known method.

The necessary pressure decrease for re-establishing or maintaining the driving stability of the vehicle is achieved in the referenced embodiment of the invention, in which switching valves 10 and 12 are used as braking pressure modulators, by control of the periodic change-over times of these valves. It has proved advantageous to keep the pulse repetition frequency constant, by the action of which the outlet valves 11, 13 are switched to open passage for decrease of the braking pressure, while simultaneously the inlet valves 10, 12 are changed over or the passage is interrupted, and to vary the ratio of pulse width to pulse pause in dependence upon the required pressure decrease. According to the necessary pressure variation and the design of the electronics in block 22, it is possible within the pulse pauses, during which the outlet valves 11, 13 are switched to be closed, to switch the inlet valves 10, 12 for predetermined period of time to the condition open passage or to closed passage, the pressure in the wheel brake cylinders remaining constant in the latter event because both the outlet and inlet valves are "closed."

By virtue of variation of the pulse repetition frequency and by maintaining the pulse duration constant, the periodic decrease and the re-increase as well as the phases in which the pressure is maintained constant can likewise be adapted to conform to the requirements defined by the electronic combining circuit in circuit block 22 in dependence upon the measured values.

The admissible pressure fluctuations, the pressure-decrease cycle etc. depend among other also upon the dimensioning of accumulator 3 and pump 4, because these aggregates have to generate within the time available the energy that is discharged via the outlet valves 11, 13 when pressure balance takes place.

Instead of the switching valves 10 through 13, plungers can likewise be used which allow to decrease the pressure in the wheel brake cylinders by interruption of the connection to the master cylinder and by expansion of the volume in which the hydraulic medium is contained. Such plunger systems are known in the art.

The periodic pressure decrease and re-increase in the two diagonals 8, 9 of the embodiment of the present invention described hereinabove can take place synchronously or offset in phase. It will be ensured in the event of a phase shift by 180° that, during brake slip control, a minimum of braking pressure prevails at least in one diagonal and that, consequently, the wheels are able to effect maximum side guidance. This is of particular advantage during braking operations entailing a very low coefficient of friction, because the temporary locking of some wheels may be favorable in such situations toward the end of obtaining a short stopping distance.

The influences on the stability will be kept to a minimum by virtue of a sufficiently rapid sequence of the pressure-decrease and pressure-increase phases of, for example, 5 to 10 hertz; if necessary, effects due to the pulsating braking pressure fluctuations on the steering can be compensated for by the negative scrub radius principle.

What is claimed is:

1. A brake-slip-controlled brake system for an automotive vehicle having front and rear wheels each having wheel brake cylinders, said system comprising, in combination:

a petal-actuated master cylinder;

an auxiliary energy source connected to said master cylinder for increasing the pressure in said master cylinder in response to brake actuation;

a first brake pressure fluid circuit connecting said master cylinder to one front wheel brake cylinder and to one rear wheel brake cylinder;

a second brake pressure fluid circuit connecting said master cylinder to the other front wheel brake cylinder and to the other rear wheel brake cylinder;

first and second normally open control valves respectively connected in said first and second brake pressure circuits and said control valves being responsive to control signals to close said control valves;

first and second normally closed control valves respectively connected between a fluid supply reservoir and said first and second brake pressure circuits, said normally closed control valves being responsive to control signals to open said normally closed control valves;

a first sensor coupled to said master cylinder for providing electrical signals indicative of braking pressure;

a second sensor coupled to said vehicle for providing electrical signals indicative of translational deceleration of said vehicle;

a third sensor coupled to at least one vehicle axle for providing electrical signals indicative of axle load;

means coupled to said sensors and said normally open and normally closed control valves for providing output control signals when said electrical signals indicate an imminent wheel locked condition to periodically open and close said valves in accordance with a predetermined pulse repetition frequency when said electrical signals indicate an imminent wheel locked condition.

2. The brake system according to claim 1, including fourth and fifth sensors respectively coupled to said master cylinder and said wheels for respectively providing electrical signals indicative of brake force and brake torque.

3. The brake system according to claim 1 wherein said pulse repetition frequency operates said normally open valves and said normally closed valves to move periodically between a pressure decrease phase, a constant pressure phase and a pressure re-increase phase in said first and second brake pressure fluid circuits.

4. The brake system according to claim 3, wherein the pulse repetition frequency is maintained at a constant value, and the duration of at least one of said phases is varied as a function of at least one of said electrical signals.

* * * * *